(12) United States Patent
Braeuchle et al.

(10) Patent No.: US 11,794,643 B2
(45) Date of Patent: Oct. 24, 2023

(54) METHOD FOR WARNING ROAD USERS BY MEANS OF SURROUNDINGS MONITORING FOR A RUNNING VEHICLE, AND APPARATUS FOR PERFORMING THE METHOD

(71) Applicant: Robert Bosch GmbH, Stuttgart (DE)

(72) Inventors: Goetz Braeuchle, Reichartshausen (DE); Margarete Deutscher, Obersulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/398,529

(22) Filed: Aug. 10, 2021

(65) Prior Publication Data
US 2022/0048431 A1 Feb. 17, 2022

(30) Foreign Application Priority Data

Aug. 12, 2020 (DE) .................... 10 2020 210 238.4

(51) Int. Cl.
*B60Q 5/00* (2006.01)
*B60Q 9/00* (2006.01)
*B60Q 1/50* (2006.01)

(52) U.S. Cl.
CPC ............ *B60Q 5/006* (2013.01); *B60Q 9/008* (2013.01); *B60Q 1/525* (2013.01); *B60Q 2400/50* (2013.01)

(58) Field of Classification Search
None
See application file for complete search history.

(56) References Cited

U.S. PATENT DOCUMENTS

| | | | | |
|---|---|---|---|---|
| 8,155,856 B2* | 4/2012 | Sekiguchi | ............. | B60W 30/16 340/439 |
| 8,330,592 B2* | 12/2012 | von Zeppelin | ........ | G08G 1/167 348/148 |
| 2004/0088095 A1* | 5/2004 | Eberle | .................. | B60R 21/013 701/1 |
| 2005/0073438 A1* | 4/2005 | Rodgers | ................. | G08G 1/161 340/944 |
| 2007/0109146 A1* | 5/2007 | Tengler | .................. | G08G 1/161 340/902 |

(Continued)

FOREIGN PATENT DOCUMENTS

| | | | |
|---|---|---|---|
| DE | 102018222003 A1 * | 6/2020 | |
| DE | 102019214004 A1 * | 3/2021 | |

(Continued)

*Primary Examiner* — Muhammad Adnan
(74) *Attorney, Agent, or Firm* — Michael Best & Friedrich LLP

(57) ABSTRACT

A method for warning road users by means of surroundings monitoring for a running vehicle is disclosed and furthermore situation detection for the road users in the surroundings of the running vehicle and ascertainment of the probable paths of movement of the running vehicle and the other road users, furthermore ascertainment of an impending hazard situation and, if an impending hazard situation is ascertained, audible warning in and around the running vehicle. Furthermore, an apparatus for performing the method for warning road users is disclosed, wherein the running vehicle is in the form of a land vehicle and the other road users can move in a ground-based manner.

18 Claims, 4 Drawing Sheets

(56) References Cited

U.S. PATENT DOCUMENTS

| | | | | |
|---|---|---|---|---|
| 2008/0189040 A1* | 8/2008 | Nasu | G08G 1/163 | 701/301 |
| 2009/0040037 A1* | 2/2009 | Schraga | B60Q 1/00 | 340/459 |
| 2009/0178486 A1* | 7/2009 | Klee | G01S 15/931 | 73/629 |
| 2009/0212993 A1* | 8/2009 | Tsunekawa | B60R 21/0134 | 342/70 |
| 2009/0228174 A1* | 9/2009 | Takagi | B60T 8/17558 | 701/41 |
| 2010/0052884 A1* | 3/2010 | Zeppelin | B60W 30/16 | 340/436 |
| 2011/0199199 A1* | 8/2011 | Perkins | B60Q 9/008 | 340/435 |
| 2012/0139715 A1* | 6/2012 | Yamazato | B60Q 9/008 | 340/436 |
| 2013/0158795 A1* | 6/2013 | Hahne | B60Q 5/008 | 701/36 |
| 2013/0338877 A1* | 12/2013 | Straus | G08G 1/161 | 701/41 |
| 2014/0214271 A1* | 7/2014 | Choi | B60W 30/095 | 701/36 |
| 2015/0054637 A1* | 2/2015 | Kim | B60R 16/0232 | 340/438 |
| 2015/0329046 A1* | 11/2015 | Igarashi | G08G 1/166 | 340/435 |
| 2017/0061761 A1* | 3/2017 | Kolla | G08B 21/0261 | |
| 2018/0233048 A1* | 8/2018 | Andersson | B60Q 1/525 | |
| 2019/0143894 A1* | 5/2019 | Ikeda | H04W 4/40 | 340/435 |
| 2020/0283021 A1* | 9/2020 | Horii | B60K 28/14 | |
| 2020/0284872 A1* | 9/2020 | Fix | G01S 13/931 | |
| 2020/0312059 A1* | 10/2020 | Yoshizawa | B60W 50/14 | |
| 2020/0369202 A1* | 11/2020 | Ching | B60Q 1/32 | |
| 2021/0300358 A1* | 9/2021 | Sherrit | B60Q 9/008 | |
| 2021/0316660 A1* | 10/2021 | Kopp | B60W 60/00274 | |
| 2021/0394778 A1* | 12/2021 | Oh | B60W 30/085 | |

FOREIGN PATENT DOCUMENTS

| | | |
|---|---|---|
| EP | 3045996 A1 | 7/2016 |
| EP | 3064411 A1 | 9/2016 |
| EP | 3091338 A1 | 11/2016 |
| EP | 3352154 A1 | 7/2018 |

* cited by examiner

METHOD FOR WARNING ROAD USERS BY MEANS OF SURROUNDINGS MONITORING FOR A RUNNING VEHICLE, AND APPARATUS FOR PERFORMING THE METHOD

BACKGROUND OF THE INVENTION

The present invention relates to a method for warning road users by means of surroundings monitoring for a running vehicle and furthermore situation detection for the road users in the surroundings of the running vehicle and ascertainment of the probable paths of movement of the running vehicle and the other road users, furthermore ascertainment of an impending hazard situation and, if an impending hazard situation is ascertained, audible warning in and around the running vehicle. Furthermore, the present invention relates to an apparatus for performing the method for warning road users, wherein the running vehicle is in the form of a land vehicle and the other road users can move in a ground-based manner.

The electrification of the drive of motor vehicles that are in the form of motor vehicles driven by electric battery or in the form of so-called hybrid vehicles entails the problem that these vehicles are almost inaudible at low speeds on account of the quiet electric drive, since the sound of a running internal combustion engine is absent. This low noise, which is desirable for reasons of environmental protection, can lead to hazard situations if for example pedestrians or cyclists rely on their hearing and believe themselves to be safe on account of the lack of running noise. They can then unexpectedly step onto the road and/or not get out of the way of an electrically driven motor vehicle, for example. Furthermore, the density of electrically driven motor vehicles is continually increasing, particularly in major regional centers.

For these reasons, in April 2014 the European Union passed EU directive 540/2014 on the noise level of motor vehicles. This directive provides for all electric and hybrid vehicles to have to be equipped with an acoustic vehicle alert system (AVAS). Furthermore, the United Nations' working group on noise published the R138 standard for AVAS in Geneva in October 2016 and updated it as R138.01 in November 2017. In June 2017 the European Commission then adapted its regulations concerning legal directive 2017/1576 a first time according to the UN specifications. The EU and UN hold that the AVAS must be switched on at speeds up to 20 km/h, even if the motor vehicle is moving backwards. The AVAS must not be switched off, because it is a safety feature. The lower limit for the AVAS sound is 56 dB(A), approximately equivalent to the noise level of a refrigerator.

In the Pedestrian Safety Enhancement Act of 2010, which came into force on Jan. 4, 2011, the Department of Transportation in the United States of America was instructed to find a ruling for alarm sounds for motor vehicles to protect blind people and other pedestrians. The draft presented by the National Highway Traffic Safety Administration (NHTSA) in January 2013 determines the threshold up to which the AVAS needs to be active to be a speed of 18.6 mph (=30 km/h).

The specification EP 3 045 996 B1 describes a vehicle system that ascertains a minimum level of input by a driver to change over from an autonomous-driving condition to a manual-driving condition. The vehicle system comprises an external situation detection unit and a human-machine interface with a screen and a sound output unit. These are used to output a warning to the driver.

A disadvantage of this prior art proposal is that specification D1 does not disclose warning other road users from the situation detection unit.

The specification EP 3 064 411 A1 proposes a journey control unit that permits a vehicle to travel along a lane of a journey path. To this end, it detects road markings to the right and left of the road and sets a travel zone for the vehicle between the road markings and selects a prioritized journey path candidate that has a high level of straightness among a multiplicity of journey paths. A control unit additionally comprises an external situation detection unit, a vehicle position detection unit, a travel condition detection unit, an itinerary generating unit and a journey control unit. If the journey path repeatedly cannot be generated, the driver is warned accordingly.

Disadvantageously, specification D2 does not disclose warning other road users on the basis of the information from the situation detection unit.

EP 3 091 338 B1 discloses an error indicator determination device that can accurately determine whether an error indicator occurs in a parameter group. The parameter group comprises a multiplicity of journey parameters that are calculated on the basis of the input data. A control unit additionally comprises an external situation detection unit, a vehicle position detection unit, a journey condition detection unit, an itinerary generating unit, a journey control unit and the error indicator determination device. A driver can be warned via a human-machine interface.

A disadvantage of this prior art proposal is that it does not disclose warning other road users on the basis of the information from the situation detection unit.

The specification EP 3 352 154 A1 proposes an information processing device comprising a detection section, an acquisition section and a generating section. According to a fourth embodiment, information about whether or not another vehicle detects the ego vehicle is used. If it is ascertained that a hazard avoidance action needs to be performed, a hazard warning light on the ego vehicle is automatically activated. Alternatively, a vehicle-to-vehicle interface can be used to inform the other vehicle (target vehicle) of the presence of the ego vehicle, and in this way the other vehicle can be made aware of the presence of the ego vehicle.

Disadvantageously, this prior art does not disclose audibly and/or visually warning other road users by means of a signal device on the ego vehicle on the basis of the information from the situation detection unit.

The rules for the noise generators on electric and hybrid vehicles lead to unnecessary noise if they are permanently switched on even when there is no actual danger. This noise disturbs residents of streets and in the long term even damages health. For other road users, the background noise leads not only to the disturbances and long-term damage to health but also to an accustomization effect that limits the warning function and possibly loses it completely. Similarly, the absence of a warning when manual activation has not taken place constitutes a hazard. Buyers of electric or hybrid vehicles might find the sounds unpleasant and therefore avoid buying or running an applicable motor vehicle with an activated noise generator.

There is therefore a need for a method for improving road safety and for simultaneously avoiding noise.

The object of the invention is therefore to provide a method for improving road safety and for simultaneously avoiding noise.

SUMMARY OF THE INVENTION

This object is achieved according to the invention by the subject of the independent patent claim. Advantageous developments of the invention are obtained from the features of the dependent patent claims.

The present invention involving the method according to the invention for warning road users about electrically driven motor vehicles and other quiet vehicles by means of surroundings monitoring for a running electrically driven motor vehicle, or another quiet vehicle, in the first step and situation detection, which follows in the next step, for the road users in the surroundings of the running electrically driven motor vehicle, or of another quiet vehicle, and ascertainment, which takes place in the succeeding step, of the probable paths of movement of the running electrically driven motor vehicle, or of another quiet vehicle, and the other road users, and the ascertainment of an impending hazard situation in the next step, has the advantage that, in the subsequent step, only if an impending hazard situation is ascertained, an audible warning is issued in and around the running electrically driven motor vehicle, or another quiet vehicle. Advantageously, the method according to the invention avoids unnecessary noise and therefore protects the environment. Similarly, accustomization to the warning sound is advantageously avoided. It is particularly advantageous that the audible warning for road users is provided only in hazard situations, depending on the situation, and is therefore also perceived as a warning. It is advantageous that the audible warning is issued inside and outside the running electrically driven motor vehicle, or another quiet vehicle. This means that in the event of a warning the driver of the running electrically driven motor vehicle, or of another quiet vehicle, is also included in the warning.

The measures cited in the dependent claims allow advantageous developments of the apparatus specified in the independent claim.

Furthermore, the method according to the invention for warning road users about electrically driven motor vehicles and other quiet vehicles has the advantage that the warning is issued only if at least one other road user is detected. It is advantageous that the audible warning is issued only if at least one other road user is detected. This advantageously means that no unnecessary noise is caused and therefore the environment is protected.

Advantageously, the warning for road users is issued only if at least one other road user is detected within a critical range. The critical range can be defined as a speed-dependent threshold value, which advantageously means that the audible warning for road users is issued only very late at low speeds and earlier at higher speeds. This advantageously means that no unnecessary noise is caused and therefore the environment is protected.

Furthermore, the method according to the invention for warning road users about electrically driven motor vehicles and other quiet vehicles has the advantage that a warning is issued if the probable path of movement of at least one other road user will cross the path of movement of the running electrically driven motor vehicle, or of another quiet vehicle. The audible warning for road users is advantageously issued only in situations in which a possible collision course is determined. This advantageously means that no unnecessary noise is caused and the environment is protected.

It is particularly advantageous that the warning for road users about electrically driven motor vehicles and other quiet vehicles is adjusted to suit the type of the detected other road user. Advantageously, the warning for road users about electrically driven motor vehicles and other quiet vehicles can be adjusted to suit a small child or a self-driving work machine, for example. Particularly the drivers of self-driving work machines from the fields of construction, agriculture or forestry are often subjected to very loud sounds in the machines, and therefore these drivers require a particularly loud and penetrating warning, whereas the same loud and penetrating warning would lead to damage to health in the case of a small child.

Advantageously, the method for warning road users about electrically driven motor vehicles and other quiet vehicles adjusts the intensity of the warning to suit the hazard situation using the following steps, by, in one step, rating the hazard situation and, in a further step, adjusting the intensity control for the warning by means of volume adjustment and/or adjustment of the sound to suit the hazard situation. Advantageously, a very loud and aggressive audible warning for road users is issued in situations in which a collision involving harm to life and limb must be averted immediately. In other cases, reduced volume and aggressiveness for the warning can be used to give a warning. Only if this reduced warning exhibits no effect is a very loud and aggressive audible warning issued. This advantageously means that no unnecessary noise is caused and therefore the environment is protected.

There is great advantage in the method for warning road users about electrically driven motor vehicles, and other quiet vehicles, wherein the intensity of the warning is adjusted to suit the other road users to be warned using the following steps, by, in one step, rating the attentiveness of the other road user and, in a succeeding step, reinforcing the warning by means of directional sound and, in a further step, performing reinforcement of the warning by means of a combination with a light signal and, in a final step, reinforcing the warning by means of a spoken warning. This advantageously means that the intensity of the warning can be adjusted to suit the other road users to be warned. By way of example, pedestrians with headphones can be warned using a more intensive warning. It is particularly advantageous to reinforce the audible warning by means of directional sound and therefore not to excessively irritate uninvolved parties with noise. Furthermore, it is advantageous to support the audible warning with a light signal. By way of example, a laser projector can thus be used to project a warning onto the ground in front of the road user. In the case of a road user who is totally distracted by headphones and a smartphone, for example, it is advantageously possible to reinforce the warning by means of a spoken warning via a loudspeaker. This can be accomplished by using a voice from a sound generator, for example.

Advantageously, an electrically driven motor vehicle or another quiet vehicle is used to perform the method according to the invention, wherein the running electrically driven motor vehicle or another quiet vehicle is in the form of a land vehicle and the other road users can move in a ground-based manner. In a land vehicle, it is particularly advantageous to use the method according to the invention for warning road users. This advantageously improves the safety of the road traffic with quiet electric and hybrid vehicles or other quiet vehicles.

Further features and advantages of the present invention will become apparent to a person skilled in the art from the description of illustrative embodiments that follows, which should not be interpreted as limiting the invention, however, with reference to the accompanying drawings.

DETAILED DESCRIPTION

Figure 1:
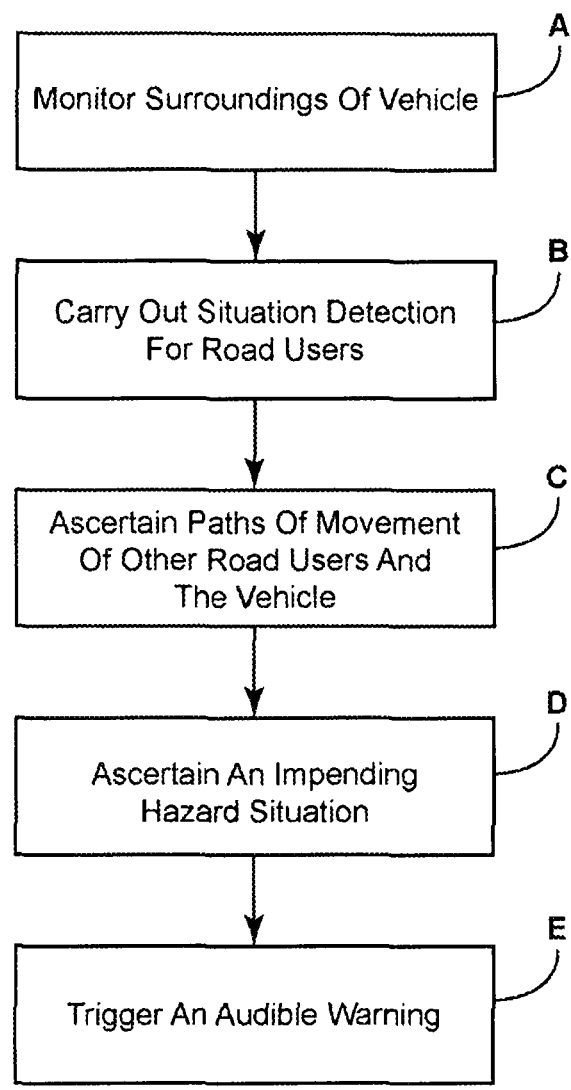
FIG. 1 shows steps A to E of the method for warning road users about motor vehicles.

All of the figures are merely schematic depictions of the method according to the invention or of the apparatus according to the invention and of component parts thereof according to exemplary embodiments of the invention. In particular intervals and magnitude relationships are not reproduced to scale in the figures. Corresponding elements are provided with the same reference numerals in the various figures.

FIG. 1 shows steps A to E of the method 1 for warning road users 2 about electrically driven motor vehicles 3. In a first step A, the surroundings 6 of a running electrically driven motor vehicle 3 are monitored using surroundings monitoring 4. The magnitude of the surroundings 6 of the running electrically driven motor vehicle 3 that are to be monitored is substantially described by the speed and the direction of travel of the electrically driven motor vehicle 3. When the electrically driven motor vehicle 3 is travelling forwards, the surroundings to be monitored by the surroundings monitoring 4 are situated in front of the motor vehicle 3; when the electrically driven motor vehicle 3 is travelling backwards they are situated behind the electrically driven motor vehicle 3. The spatial extent is determined by the speed of travel. At low speeds, the spatial extent can be chosen to be very narrow; at higher speeds, the spatial extent can be chosen to be greater in accordance with the then longer reaction distances and braking distances of the electrically driven motor vehicle 3. The detected angle of the surroundings monitoring 4 needs to be chosen to be of such magnitude that road users 2 that come from the side are thus reliably detected. The reaction distances together with the stopping distances of the electrically driven motor vehicle 3 and of the road users 2 are the lower limit of the spatial extent of the surroundings 6 monitored by the surroundings monitoring 4. For the purposes of preventive surroundings monitoring 4, the monitored surroundings 6 can furthermore be extended. In a succeeding step B, the surroundings monitoring 4 is taken as a basis for carrying out situation detection 5 for the road users 2 in the monitored surroundings 6 of the electrically driven motor vehicle 3. In the succeeding step C, the probable paths of movement 7 of the other road users 2 and the path of movement of the running electrically driven motor vehicle 3 are ascertained. The paths of movement 7 ascertained in this step are the basis for ascertaining an impending hazard situation 8 in the succeeding step D. In the next step E, an ascertained hazard situation 8 results in an audible warning 9 being triggered in and around the running electrically driven motor vehicle 3. Therefore, both the driver of the electrically driven motor vehicle 3 in the electrically driven motor vehicle 3 and the road users 2 at risk outside the electrically driven motor vehicle 3 are warned in this step.

Figure 2:
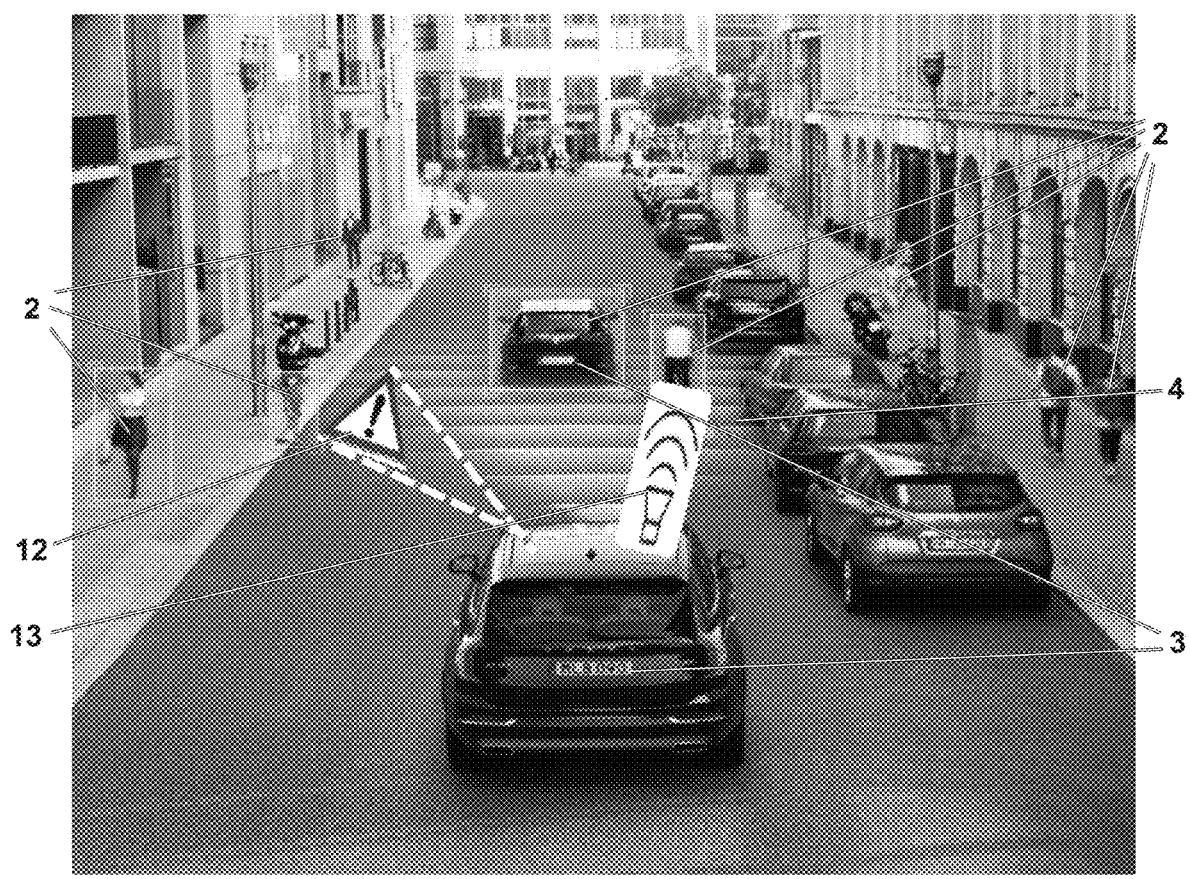
FIG. 2 shows an illustrative traffic situation for the warning of road users by means of surroundings monitoring.

FIG. 2 shows an illustrative traffic situation for the warning of road users 2 by means of surroundings monitoring 4. This traffic situation shows a typical city center situation with a large number of road users 2. In the image, it is possible to discern road users 2 as pedestrians, cyclists and as other motor vehicles 3. Pedestrians are intended to be understood to mean all people who are on foot. These include adults, children and elderly people with limited movement and awareness. Furthermore, the pedestrians also include people with limited awareness as a result of medicaments or drugs. Other road users 2 are also animals, for example dogs.

In front of the electrically driven motor vehicle 3, a cyclist and another motor vehicle 3 are moving in the same direction of travel. Particularly for the cyclist, it is very difficult to hear a quiet electrically driven motor vehicle 3 in such a situation. It is therefore important for the method 1 for warning road users 2 to detect the impending hazard situation 8 that this cyclist could, at any moment, stop, or might turn left, for example, without regard for the electrically driven motor vehicle 3 travelling behind the cyclist. An audible warning 9 is therefore used to warn the cyclist outside the electrically driven motor vehicle 3 and the driver inside the electrically driven motor vehicle 3.

Another road user 2 that can be seen, on the left-hand side of the road, is a child who has stepped onto the road, possibly in order to cross it. In this case, the ascertained paths of movement of the running electrically driven motor vehicle 3 and the other road user 2, in this case the child, show that there is an impending hazard situation if both road users 2, the child and the running electrically driven motor vehicle 3, maintain their respective direction and their respective speed. In this case, a very clear warning 9 needs to be issued to the driver of the running electrically driven motor vehicle 3 and to the pedestrian, in this case the child, in order to avert danger to life and limb. In addition, the surroundings monitoring 4 detects that a series of motor vehicles 3 are parked at the edge of the road. These parked motor vehicles 3 themselves already hold the impending hazard situation 8 of a pedestrian suddenly stepping onto the road from an interspace between the motor vehicles 3 that is not visible. In this case, an audible warning 9 therefore needs to be issued in order to signal the approach of the running electrically driven motor vehicle 3 to the road users 2 who are not yet visible, in order to avoid hazard situations 8. Similarly, a warning inside the running electrically driven motor vehicle 3 needs to signal the hazard situation 8 that is to be expected to the driver.

Figure 3:
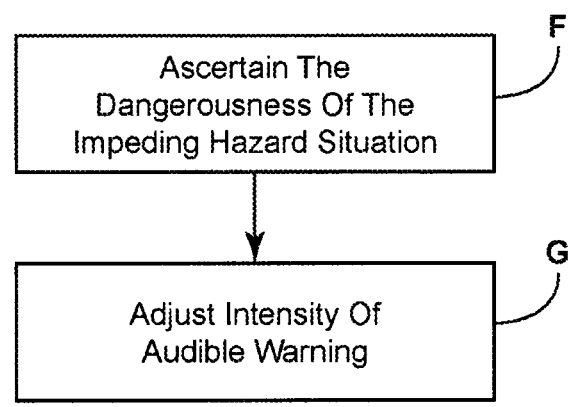
FIG. 3 shows steps F and G of the method for warning road users about motor vehicles.

FIG. 3 shows steps F and G of the method 1 for warning road users 2 about electrically driven motor vehicles 3 that are running. In a step F, on the basis of the hazard situation 8 ascertained in step D, the dangerousness of the hazard situation 8 is ascertained. In a further step G, the ascertained dangerousness of the hazard situation 8 is taken as a basis for adjusting the intensity of the warning 9 by means of volume adjustment and/or adjustment of the sound to suit the hazard situation. By way of example, the volume can simply be raised. Furthermore, the sound can be altered. In the case of a general warning, for example an internal combustion engine sound can be used, which, depending on the speed of the running electrically driven motor vehicle 3, can be increased from an idling sound to the sound of an internal combustion engine driving a motor vehicle 3. In a very dangerous situation, the sound of a foghorn can be used, for example, the volume of which can be adjusted to suit the dangerousness of the hazard situation 8.

Figure 4:
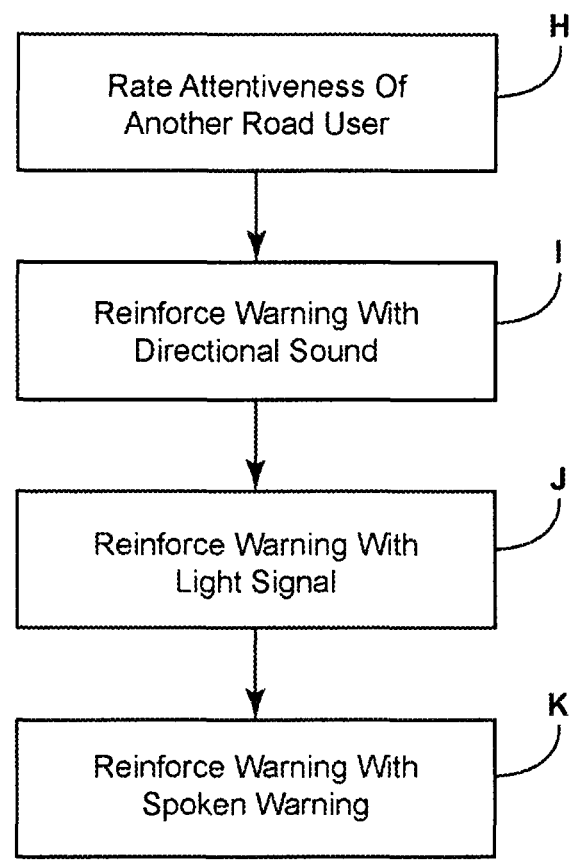
FIG. 4 shows steps H to K of the method for warning road users about motor vehicles.

FIG. 4 shows steps H to K of the method 1 for warning road users 2 about electrically driven motor vehicles 3 that are running. In a step H, the attentiveness of another road user 2 is rated. This can be done on the basis of external criteria, for example, such as a white cane, a blind person's armband or headphones. Similarly, the absence of a reaction from a road user 2 can indicate reduced attentiveness.

In a further step I, the warning 9 is reinforced for road users 2 with reduced attentiveness by means of directional sound 11. Directional sound is normally also used for the special signaling systems of privileged vehicles.

In step J, the warning 9 is reinforced by means of a light signal 12. The special signaling systems of privileged vehicles normally also involve the use of a flashing light signal. For the purposes of the inventive concept, this also includes for example the projection of signs or signals onto the ground in front of another road user 2, however.

In step K, the warning 9 is reinforced by means of a spoken warning 13. This allows targeted addressing of road users 2, for example children, elderly people or inattentive road users 2.

These reinforced warnings 9 can be usefully used when the hazard situation 8 has already become highly dangerous, that is to say another road user 2 has approached the motor vehicle 3 to within a critical range 10. Since the driver of the running electrically driven motor vehicle 3 is always warned too, the driver may be able to initiate braking in order to avert harm to life and limb for another road user 2.

In the same way, the method 1 for warning road users 2 can be applied when a running electrically driven motor vehicle 3 is reversed. Since the driver's vision is generally limited at the rear, this method contributes to increasing road safety if both the driver of the running electrically driven motor vehicle 3 and other road users 2 are warned about dangerous situations.

The invention claimed is:

1. A method (1) for warning road users (2) about vehicles (3), the method comprising the following steps:
    monitoring surroundings of a running vehicle (3) via a sensor to generate monitored surroundings;
    modifying an area of the monitored surroundings based on a condition of a speed of the running vehicle (3);
    situation detection (5) for the road users (2) in the modified monitored surroundings of the surroundings (6) of the running vehicle (3);
    ascertainment of probable paths of movement (7) of the running vehicle (3) and the road users (2);
    detecting a set of objects in the modified monitored surroundings, wherein an interspace exists between the detected set of objects and the interspace is not visible in the generated monitored surroundings;
    ascertainment of an impending hazard situation (8) based on the interspace of the detected set of objects in the modified monitored surroundings; and
    if an impending hazard situation (8) is ascertained, audible warning (9) in and around the running vehicle (3).

2. The method (1) for warning road users (2) about vehicles (3) according to claim 1,
    wherein
    a warning (9) is issued if at least one other road user (2) is detected.

3. The method (1) for warning road users (2) about vehicles (3) according to claim 2,
    wherein
    a warning (9) is issued if at least one other road user (2) is detected within a critical range (10).

4. The method (1) for warning road users (2) about vehicles (3) according to claim 2,
    wherein
    a warning (9) is issued if the probable path of movement (7) of at least one other road user (2) will cross the path of movement (7) of the running vehicle (3).

5. The method (1) for warning road users (2) about vehicles (3) according to claim 1,
    wherein
    the warning (9) is adjusted to suit the type of the detected other road user (2).

6. The method (1) for warning road users (2) about vehicles (3) according to claim 1,
    wherein
    the intensity of the warning (9) is adjusted to suit the hazard situation (8) using the following steps:
    rating the dangerousness of the hazard situation (8);
    intensity control for the warning (9) by means of volume adjustment and/or adjustment of the sound to suit the hazard situation (8).

7. The method (1) for warning road users (2) about vehicles (3) according to claim 6,
    wherein
    the intensity of the warning (9) is adjusted to suit the other road users (2) to be warned using the following steps:
    rating the attentiveness of the other road user (2);
    reinforcement of the warning (9) by means of directional sound (11);
    reinforcement of the warning (9) by means of combination with a light signal (12);
    reinforcement of the warning (9) by means of a spoken warning (13).

8. The method (1) for warning road users (2) about vehicles (3) according to claim 1, wherein the condition is a reaction distance.

9. The method (1) for warning road users (2) about vehicles (3) according to claim 1, wherein the condition is a braking distance.

10. The method (1) for warning road users (2) about vehicles (3) according to claim 1, wherein the road users (2) in the surroundings (6) of the running vehicle (3) are not visible in the monitored surroundings.

11. The method (1) for warning road users (2) about vehicles (3) according to claim 1, further comprising:
    determining that the road users (2) in the surroundings (6) are associated with a hazard situation based on the road users (2) being detected in the modified monitored surroundings.

12. A vehicle (3) configured to,
    perform monitoring of surroundings of the vehicle (3) when running via a sensor to generate monitored surroundings;
    modify an area of the monitored surroundings of the vehicle (3) based on a condition of a speed of the vehicle (3);
    perform situation detection (5) for road users (2) in the modified monitored surroundings of the surroundings (6) of the vehicle (3);
    detect a set of objects in the modified monitored surroundings, wherein an interspace exists between the detected set of objects and the interspace is not visible in the generated monitored surroundings;
    ascertain probable paths of movement (7) of the vehicle (3) and the road users (2);
    ascertain an impending hazard situation (8) based on the interspace of the detected set of objects in the modified monitored surroundings; and if an impending hazard situation (8) is ascertained, generate an audible warning (9) in and around the vehicle (3),
wherein
the vehicle (3) is a land vehicle and the road users (2) move in a ground-based manner.

13. The vehicle (3), according to claim 12, wherein the condition is a reaction distance.

14. The vehicle (3), according to claim 12, wherein the condition is a braking distance.

15. The vehicle (3), according to claim 12, wherein the road users (2) in the surroundings (6) of the vehicle (3) are not visible in the monitored surroundings.

16. The vehicle (3), according to claim 12 is further configured to
determine that the road users (2) in the surroundings (6) is associated with a hazard situation based on the road users (2) being detected in the monitored surroundings that is modified.

17. The method (1) for warning road users (2) about vehicles (3) according to claim 1,
wherein a sound of the warning (9) is altered from a first sound to a second sound based on an increase in the speed of the vehicle (3), and wherein the second sound is a variant of the first sound.

18. The vehicle (3), according to claim 12, wherein a sound of the warning (9) is altered from a first sound to a second sound based on an increase in the speed of the vehicle (3), and wherein the second sound is a variant of the first sound.

* * * * *